United States Patent
Washizu et al.

(10) Patent No.: US 11,117,257 B2
(45) Date of Patent: Sep. 14, 2021

(54) ROBOT SYSTEM FOR PERFORMING LEARNING CONTROL BASED ON MACHINING RESULTS AND CONTROL METHOD THEREFOR

(71) Applicant: FANUC CORPORATION, Yamanashi (JP)

(72) Inventors: Shinichi Washizu, Yamanashi (JP); Hajime Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 311 days.

(21) Appl. No.: 16/248,786

(22) Filed: Jan. 16, 2019

(65) Prior Publication Data
US 2019/0248005 A1 Aug. 15, 2019

(30) Foreign Application Priority Data
Feb. 14, 2018 (JP) .............................. JP2018-024188

(51) Int. Cl.
*G05B 19/04* (2006.01)
*G05B 19/18* (2006.01)
*B25J 9/16* (2006.01)
*B25J 11/00* (2006.01)

(52) U.S. Cl.
CPC ............. *B25J 9/163* (2013.01); *B25J 9/1664* (2013.01); *B25J 11/005* (2013.01)

(58) Field of Classification Search
CPC ........ B25J 9/163; B25J 11/005; B25J 9/1664; B25J 9/1697; B23K 26/0884; B23K 26/21; B23K 26/38; B23K 9/124; B23K 9/16; B23K 9/32
See application file for complete search history.

(56) References Cited

U.S. PATENT DOCUMENTS

| 10,029,334 B2* | 7/2018 | Kim ..................... B23K 31/125 |
| 2011/0023610 A1* | 2/2011 | Ume ................... G01N 29/4481 73/622 |
| 2012/0296471 A1* | 11/2012 | Inaba ....................... B25J 9/163 700/253 |

(Continued)

FOREIGN PATENT DOCUMENTS

| JP | S63154263 A | 6/1988 |
| JP | H01106107 A | 4/1989 |

(Continued)

*Primary Examiner* — Harry Y Oh
(74) *Attorney, Agent, or Firm* — Hauptman Ham, LLP

(57) ABSTRACT

A learning control unit includes a machining device performance calculation section for calculating performance of a machining device during machining or after machining based on a motion command issued to a robot by a controller, a machining command issued to the machining device by the controller, and machining results measured by a sensor, an operation speed correction information calculation section for calculating operation speed correction information of the robot based on the performance of the machining device so as to satisfy a preset acceptable condition of the machining error, and under an allowable load condition of the robot, and a learning completion determination section for determining whether or not learning has completed based on previous correction information and current correction information.

15 Claims, 7 Drawing Sheets

(56) References Cited

U.S. PATENT DOCUMENTS

2018/0293501 A1* 10/2018 Ambati .................. G06N 5/02

FOREIGN PATENT DOCUMENTS

| JP | H5-104436 A | 4/1993 |
|---|---|---|
| JP | H06269719 A | 9/1994 |
| JP | H07200033 A | 8/1995 |
| JP | H08202426 A | 8/1996 |
| JP | H09117709 A | 5/1997 |
| JP | H09305209 A | 11/1997 |
| JP | H10249525 A | 9/1998 |
| JP | 2003225877 A | 8/2003 |
| JP | 2004017088 A | 1/2004 |
| JP | 2011192267 A | 9/2011 |
| JP | 2012-236267 A | 12/2012 |
| JP | 2012240142 A | 12/2012 |
| JP | 2015226900 A | 12/2015 |
| JP | 2016016488 A | 2/2016 |
| JP | 2017030014 A | 2/2017 |
| JP | 6088190 B2 | 3/2017 |
| JP | WO2015/098126 A1 | 3/2017 |

* cited by examiner

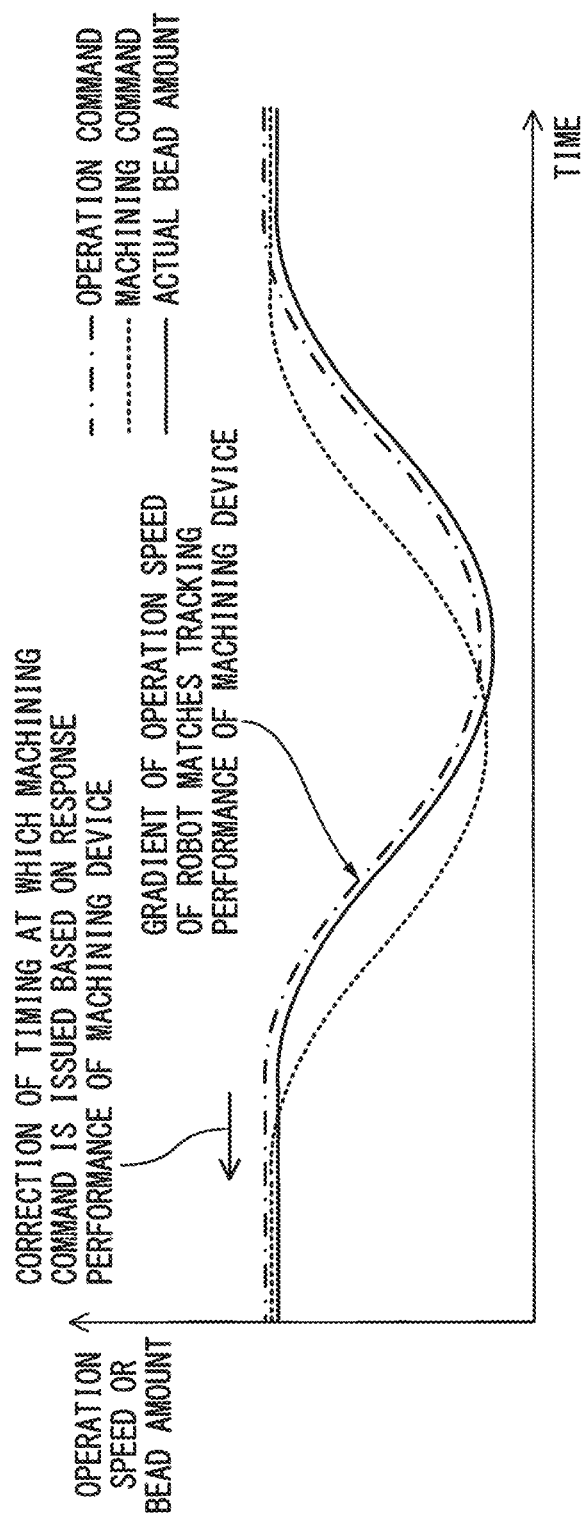

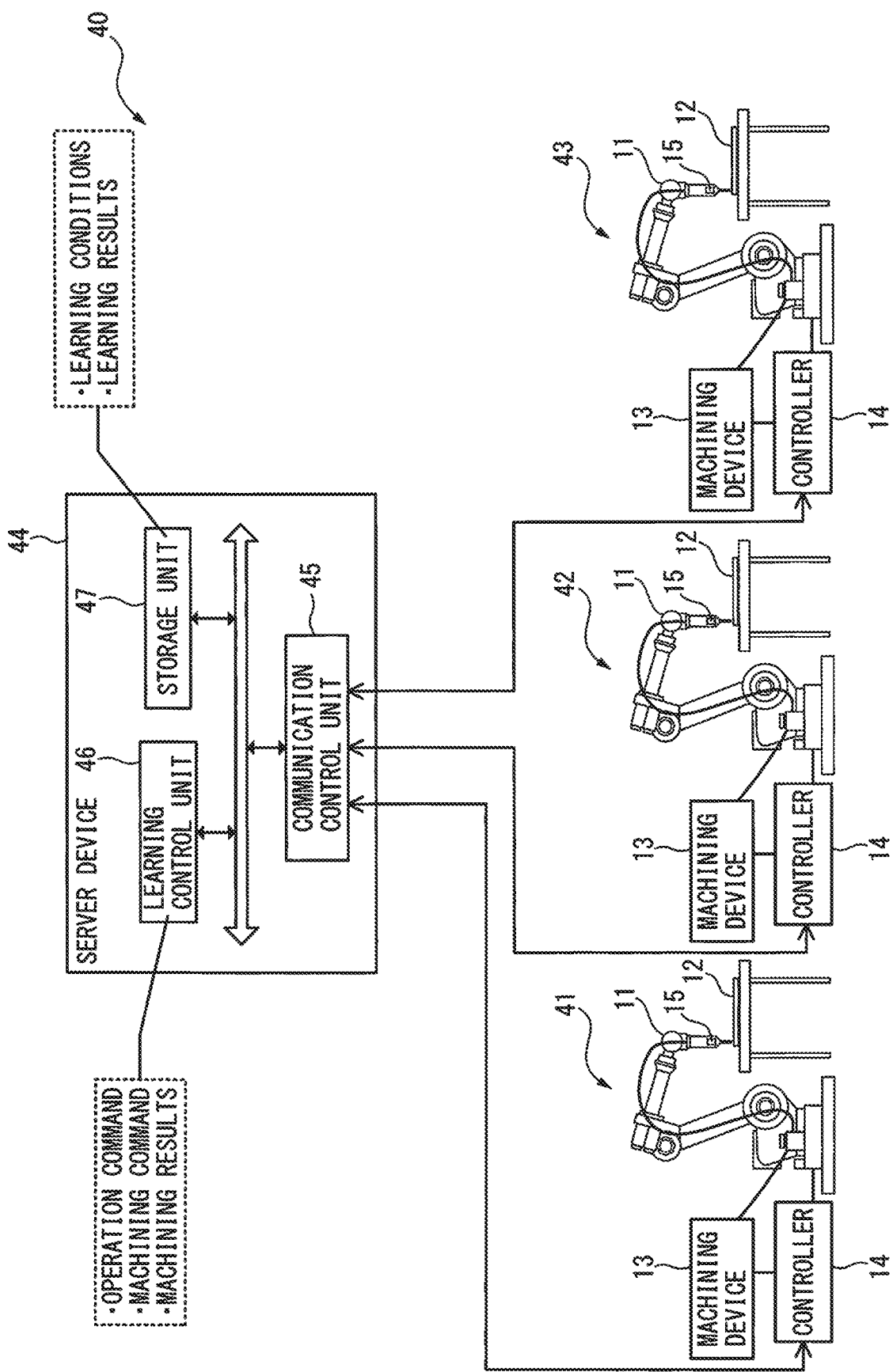

ROBOT SYSTEM FOR PERFORMING LEARNING CONTROL BASED ON MACHINING RESULTS AND CONTROL METHOD THEREFOR

RELATED APPLICATIONS

The present application claims priority of Japanese Application Number 2018-024188, filed on Feb. 14, 2018, the disclosure of which is hereby incorporated by reference herein in its entirety.

BACKGROUND OF THE INVENTION

1. Technical Field

The present invention relates to a robot control technology, and in particular, relates to a robot system which performs learning control based on machining results and a control method therefor.

2. Description of Prior Art

In applications such as sealing, welding, and laser machining, the prevention of robot vibration leads to improved machining quality. However, in addition to robot vibration, machining quality changes due to vibration of the workpiece during machining and the performance of the machining device performing the sealing, welding, or laser machining.

For example, when a workpiece vibrates in a system performing laser machining while the posture of the workpiece changes, there is a limit to the improvement in machining quality which can be brought about by simply eliminating vibration at the robot tip. In a sealing system, since there is a response delay in the machining device from the time at which the sealant flow rate command is issued until the actual machining is performed, sufficient machining quality cannot be obtained. Furthermore, though there are systems for maintaining a constant bead width and bead thickness by changing the sealant flow rate in accordance with the operation speed of the robot, in such systems, if the operation speed of the robot changes rapidly, a change in the sealant flow rate cannot be performed quickly enough, and the quality of the sealing may be reduced.

As technologies related to the present application, the publications described below have been proposed. Japanese Unexamined Patent Publication (Kokai) No. 05-104436 discloses a polishing machine having an integrated tactile sensor, comprising a polisher provided on a robot end effector, a tactile sensor provided integrally with the polisher for detecting the surface condition of a workpiece, and a machining control unit for changing the machining conditions of the polishing machine in accordance with the detected surface condition.

Japanese Unexamined Patent Publication (Kokai) No. 2012-236267 discloses a machining conditions searching device, comprising a processing machine for experimentally machining a workpiece in accordance with experimental machining conditions, a machining results collection means for accumulating a combination of machining results of the experimental machining and the experimental machining conditions as experimental machining data, a first machining characteristic model generation means for generating a new machining characteristic model representing the relationship between the machining conditions and the machining results using the experimental machining data, and a second machining characteristics model generation means for generating a new machining characteristics model reflecting a machining pass/fail evaluation while changing the pass/fail evaluation in the machining results in the experimental machining data one-by-one.

Re-publication of PCT Publication No. 2015/098126 discloses a machining support system, comprising a machining unit for machining a workpiece by driving a machine tool, a workpiece support force generation unit for generating a workpiece support force against a machining reaction force, a support device for moving while supporting the workpiece support force generation unit, and a workpiece support force controller for controlling the operation of the workpiece support force generation unit and the support device based on machining reaction force related data and machining position related data.

Japanese Patent No. 6088190 discloses a machining system, comprising a machining device for machining a workpiece, a machining controller for machining a workpiece on the machining device in accordance with a machining program, a workpiece measurement device for measuring the shape of the workpiece, and a measurement controller for controlling the operation of the robot for measurement and measuring the shape of the workpiece in the workpiece measurement device, wherein the machining controller is configured so as to correct the machining program based on workpiece shape information.

SUMMARY OF THE INVENTION

In order to improve machining quality, it is necessary to operate robots and machining devices in consideration of not only vibration of the tip of the robot but rather the entire system, such as vibration of the workpiece during machining and performance of the machining device. The teaching of such operation requires trial and error, and skill of the teacher who teaches and modifies the teaching while actually viewing the machining result, and takes time and effort. A technology of performing learning control based on machining results in consideration of the entire system has been demanded.

An aspect of the present disclosure provides a robot system, comprising a robot, a machining device for machining a workpiece, a controller for controlling the robot and the machining device, a sensor for detecting machining results, and a learning control unit for performing learning control based on the machining results, wherein the learning control unit comprises a machining device performance calculation section for calculating performance of the machining device during machining or after machining based on a motion command issued to the robot by the controller, a machining command issued to the machining device by the controller, and machining results measured by the sensor, an operation speed correction information calculation section for calculating operation speed correction information of the robot based on the performance of the machining device so as to satisfy a preset acceptable condition of the machining error, and under an allowable load condition of the robot, and a learning completion determination section for determining whether or not learning has completed based on previous correction information and current correction information.

Another aspect of the present invention provides a method for the control of a robot system comprising a robot, a machining device for machining a workpiece, a controller for controlling the robot and the machining device, a sensor for measuring machining results, and a learning control section for performing learning control based on the machining results, the method causing the learning control section to execute the steps of calculating performance of the machining device during machining or after machining based on a motion command issued to the robot by the controller, a machining command issued to the machining device by the controller, and machining results measured by the sensor, calculating operation speed correction information of the robot based on the performance of the machining device so as to satisfy a preset acceptable condition of the machining error, and under an allowable load condition of the robot, and determining whether or not learning has completed based on prior correction information and current correction information.

BRIEF DESCRIPTION OF THE DRAWINGS

FIG. 5B is a graph showing a motion command issued to the robot, the machining command issued to a machining device, and an actual bead amount after learning.

FIG. 7 is a block diagram of a robot system according to another embodiment, comprising a plurality of sets of machining systems and a server device communicable with the plurality of sets of machining systems.

DETAILED DESCRIPTION

Figure 1:
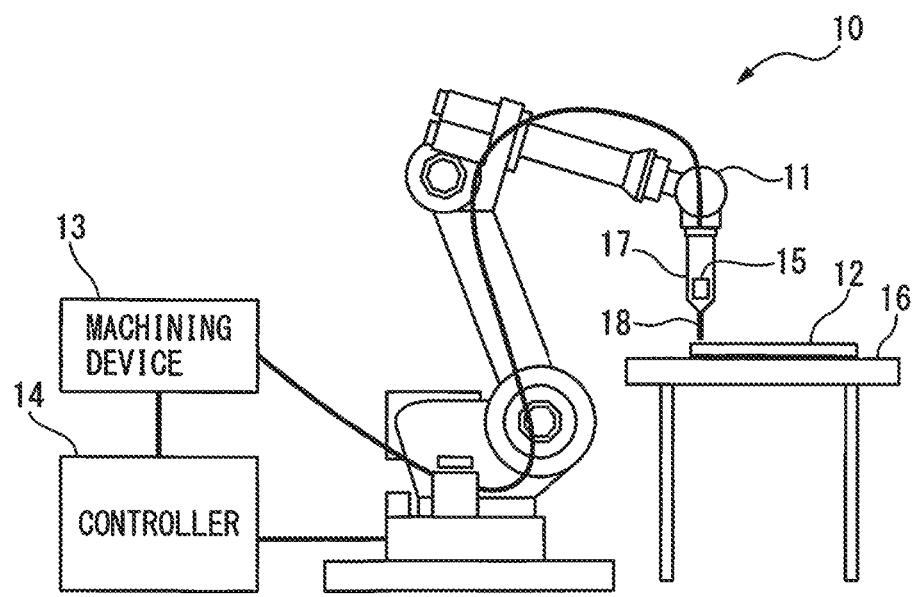
FIG. 1 is a schematic view of a robot system according to an embodiment.

The embodiments of the present disclosure will be described below with reference to the attached drawings. In the drawings, the same or equivalent constituent elements are assigned the same or equivalent reference numerals. Furthermore, the embodiments described below do not limit the technical scope of the inventions described in the claims or the meanings of the terms described therein.

Figure 2:
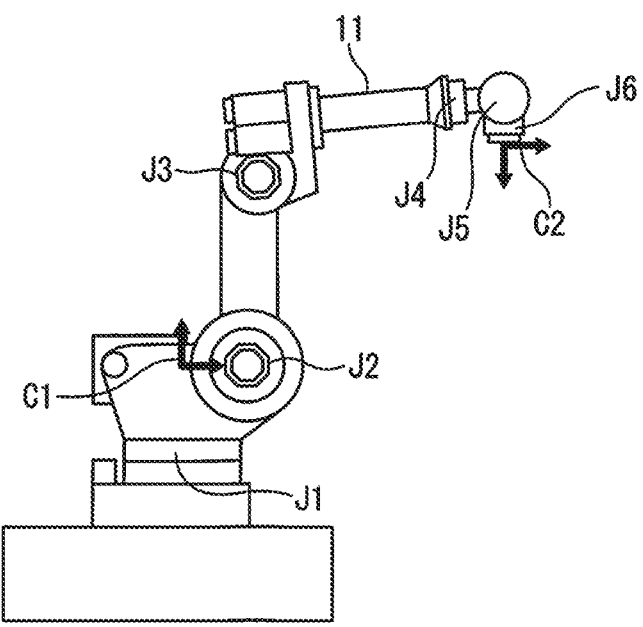
FIG. 2 is a configuration view of a robot according to the embodiment.

FIG. 1 is a schematic view of a robot system 10 according to the present embodiment and FIG. 2 is a configuration view of a robot 11 according to the present embodiment. As shown in FIG. 1, the robot system 10 comprises a robot 11, a machining device 13 for performing machining on a workpiece 12, a controller 14 for controlling the robot 11 and the machining device 13, a sensor 15 for measuring machining results, and a learning control unit (refer to FIG. 3) for performing learning control based on the machining results. Note that though the workpiece 12 is supported by a jig 16 for positioning the workpiece 12, in different embodiments, the jig 16 may be a positioner for rotating and positioning the workpiece 12, may be a stage capable of adjusting the position of the workpiece 12 in the X-axis, Y-axis, and Z-axis directions, or may be another robot hand for grasping the workpiece 12.

As shown in FIG. 2, the robot 11 is a known robot manipulator comprising servomotors, and six joint axes J1 to J6 including speed reducers or the like. A world coordinate system C1 defined in space and a mechanical interface coordinate system C2 defined at the flange position of the joint axis J6 on the wrist side are defined. The robot 11 comprises an end effector 17 attached to the wrist side of the joint axis J6.

Referring again to FIG. 1, the machining device 13 comprises a sealing device for performing sealing of the workpiece 12 in accordance with a sealant flow rate command. The sealing device comprises a sealing gun 18 attached to the end effector 17 of the robot 11. The sealing gun 18 discharges sealant to the workpiece 12 in accordance with the flow rate command. In different embodiments, the machining device 13 may comprise an arc welding device for performing arc welding on the workpiece 12 in accordance with a welding wire feed command, may comprise a laser machining device for performing laser machining on the workpiece 12 in accordance with a laser light output command, or may comprise a combination of these.

The controller 14 is wired or wirelessly communicatively connected to the robot 11, the machining device 13, and the sensor 15. The controller 14 issues a motion command to the robot 11, issues a machining command to the machining device 13, and acquires machining results from the sensor 15. The motion command issued to the robot 11 may include a position command, a speed command, or the like. The machining command issued to the machining device 13 may include a flow rate command, a feed command, an output command, or the like in accordance with the configuration of the machining device 13. The controller 14 enables uniform machining of the workpiece 12 by changing the machining command issued to the machining device 13 in accordance with the operation speed of the robot 11.

The sensor 15 is attached to the end effector 17 of the robot 11. In different embodiments, the sensor 15 may be attached to a support structure other than the robot 11. The sensor 15 comprises a three-dimensional sensor such as a stereo camera or a laser scanner, and generates machining results including three-dimensional data on a sealing bead, a welding bead, or the like (hereinafter referred to simply as "bead"). In an alternative embodiment in which the thickness of the bead is constant, the sensor 15 may comprise a two-dimensional sensor such as a CCD camera or a CMOS camera. In such a case, the sensor 15 generates machining results including two-dimensional data on the bead. The sensor 15 transmits the machining results to the controller 14 during machining or after machining.

Figure 3:
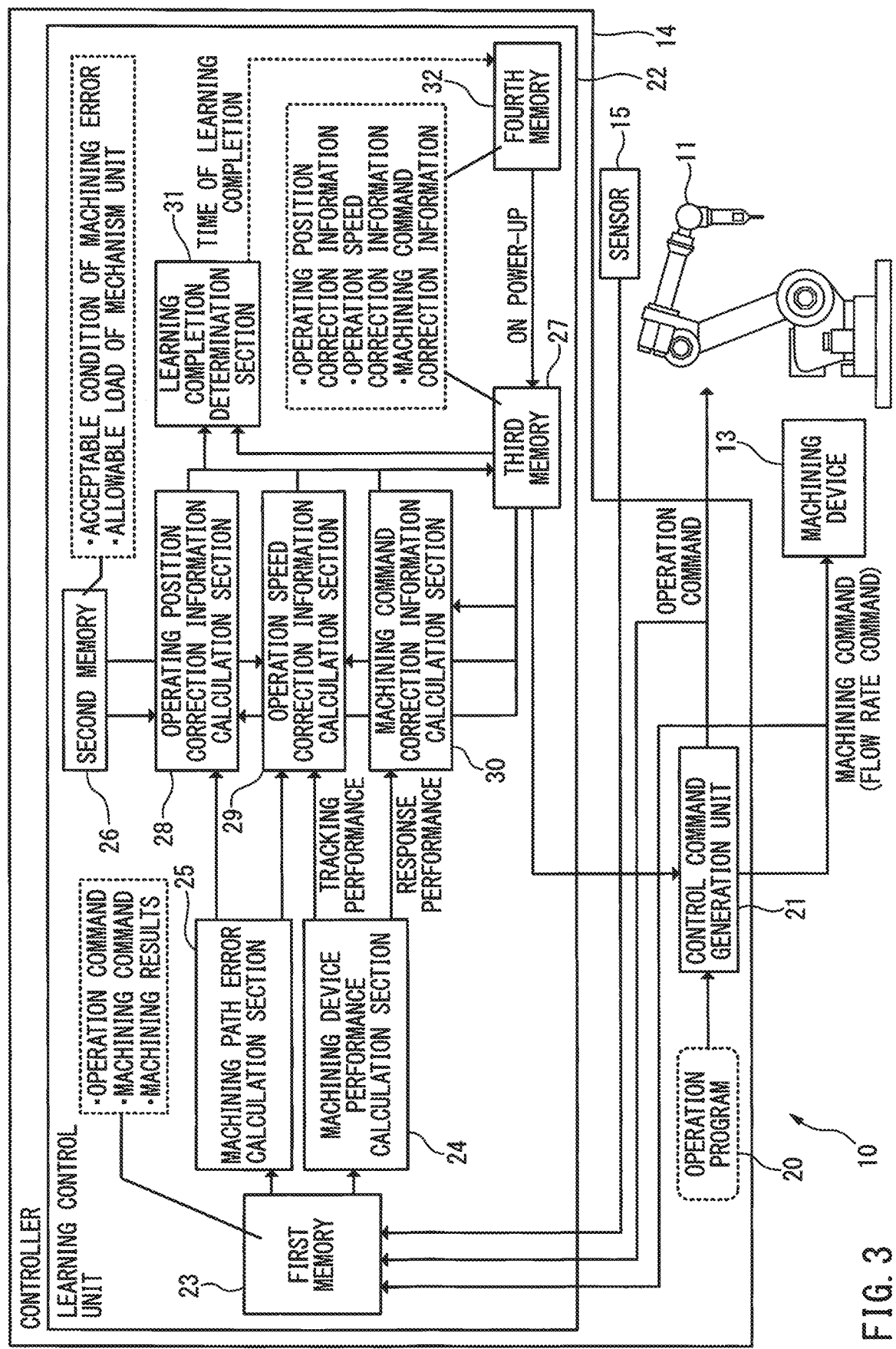
FIG. 3 is a block diagram of the robot system according to the embodiment.

FIG. 3 is a block diagram of the robot system 10 according to the present embodiment. The controller 14 comprises a control command generation unit 21 for generating, by an operation program 20, control commands including the motion command issued to the robot 11, the machining command (or the flow rate command in the case of sealing) issued to the machining device 13, and the like. The control command generation unit 21 is configured so as to perform position feedback control, speed feedback control, etc., so as to match the actual position and the actual speed of the robot mechanism unit with a target position and target speed.

However, even if such control is performed, the robot 11 or the workpiece 12 may vibrate due to a lack of rigidity of the robot 11, the jig 16, etc., whereby a machining path error relative to a target path is generated. In addition to the machining path error, bead width error and bead thickness error relative to the target width and target thickness of the bead are generated due to the performance of the machining device 13. Thus, the controller 14 comprises a learning control unit 22 for performing learning control based on machining results which take the entirety of the machining system into consideration.

The learning control unit 22 comprises a machining device performance calculation section 24 for calculating, during machining or after machining, performance of the machining device 13 based on the motion command, machining command, and machining results stored in a first memory 23. The machining device performance calculation section 24 calculates the actual bead amount per unit time from the motion command and the machining results, and calculates the response performance of the machining device 13, which is a response time taken from the issuance of the machining command to the actual performance of machining, based on a time different between a changing point of the machining command and the actual changing point of the bead amount. Further, the machining device performance calculation section 24 calculates tracking performance of the machining device 13 in response to the machining command by calculating the actual amount of change per unit time of the bead amount. In other words, the performance of the machining device includes the response performance of the machining device 13, which is a response time taken from the issuance of the machining command to the performance of machining, and tracking performance of the machining device 13 in response to the machining command.

The learning control unit 22 comprises a machining path error calculation section 25 for calculating the machining path error relative to the target path based on the motion command and the machining results stored in the first memory 23. The machining path error calculation section 25 calculates the machining path by calculating the target path from the motion command and the central axis line of the bead from the machining results, and calculates the machining path error by comparing the target path and the machining path.

The learning control unit 22 further comprises an operation position correction information calculation section 28 for calculating current operating position correction information so as to satisfy an acceptable condition of machining error stored in a second memory 26 based on prior operating position correction information stored in a third memory 27. The operating position correction information calculation section 28 does not update the prior operating position correction information when the machining path error satisfies the acceptable condition. The operating position correction information calculation section 28 calculates the current operating position correction information so as to eliminate the machining path error when the machining path error does not satisfy the acceptable condition. The operating position correction information calculation section 28 outputs the calculated current operating position correction information to the third memory 27 and a learning completion determination section 31, which is described later. The acceptable condition of the machining error stored in the second memory 26 may include at least one of a machining path tolerance, a bead width tolerance, and a bead thickness tolerance.

The learning control unit 22 further comprises an operation speed correction information calculation section 29 for calculating current operating speed correction information based on the machining path error and prior operating speed correction information stored in the third memory 27 so as to satisfy the acceptable condition of the machining error stored in the second memory 26 and under an allowable load condition of the robot mechanism unit stored in the second memory 26. The operation speed correction information calculation section 29 increases the operation speed under the allowable load condition of the robot mechanism unit when the machining path error satisfies the acceptable condition, calculates a speed fluctuation allowable range from the acceptable condition of the machining error when the machining path error does not satisfy the acceptable condition, and calculates the current operation speed correction information so as to reduce the operation speed under the allowable load condition of the robot mechanism unit while suppressing fluctuations in the operation speed within the speed fluctuation allowable range.

Further, the operation speed correction information calculation section 29 calculates the current operation speed correction information based on the tracking performance of the machining device 13 and the prior operation speed correction information stored in the third memory 27 so as to satisfy the acceptable condition of the machining error stored in the second memory 26 and under the allowable load condition of the robot mechanism unit stored in the second memory 26. The operation speed correction information section 29 calculates the current operation speed correction information so as to match the amount of change per unit time of the motion command with the tracking performance of the machining device 13 (i.e., the actual amount of change per unit time of the bead amount). The operation speed correction information calculation section 29 outputs the calculated current operation speed correction information to the third memory 27 and the learning completion determination section 31, which is described later.

The learning control unit 22 further comprises a machining command correction information calculation section 30 for calculating current machining command correction information based on the response performance and tracking performance of the machining device 13 and the prior machining command correction information stored in the third memory 27 so as to satisfy the acceptable condition of the machining error stored in the second memory 26. The machining command correction information calculation section 30 corrects the timing at which the machining command is performed based on the response performance of the machining device 13 and calculates the current machining command correction information so as to match the amount of change per unit time of the machining command with the tracking performance of the machining device 13 (i.e., the actual amount of change per unit time of the bead amount). The machining command correction information calculation section 30 outputs the calculated current machining command correction information to the third memory 27 and the learning completion determination section 31, which is described later.

Additionally, the learning control unit 22 comprises a learning completion determination section 31 for determining whether or not learning has completed by comparing the prior correction information stored in the third memory 27 with the input current correction information. The learning completion determination section 31 determines that learning has completed when the ratio of the values of the prior and current correction information is within a predetermined range, and conversely, determines that learning has not completed when the ratio of the values of the prior and current correction information is not within the predetermined range. When learning has completed, the learning completion determination section 31 outputs the converging correction information to a fourth memory 32. The control command generation unit 21 generates the motion command and machining command after learning based on the converging correction information stored in the third memory 27. The robot 11 and the machining device 13 perform machining of the workpiece 12 in accordance with the motion command and machining command after learning.

The first memory 23, second memory 26, and third memory 27 are volatile memories, such as DRAM, for performing fast learning. Conversely, the fourth memory 32 is a nonvolatile memory, such as EEPROM, so that the converging correction information can be reused even after electrical power has been turned off. Furthermore, the robot system 10 may further comprise an acceptable condition setting means (not shown) with which a teacher can set, in advance, the acceptable condition of the machining error stored in the second memory 26. The acceptable condition setting means is composed of acceptable condition setting software, a monitor for displaying a setting screen, and a keyboard and mouse for inputting the acceptable condition.

Figure 4:
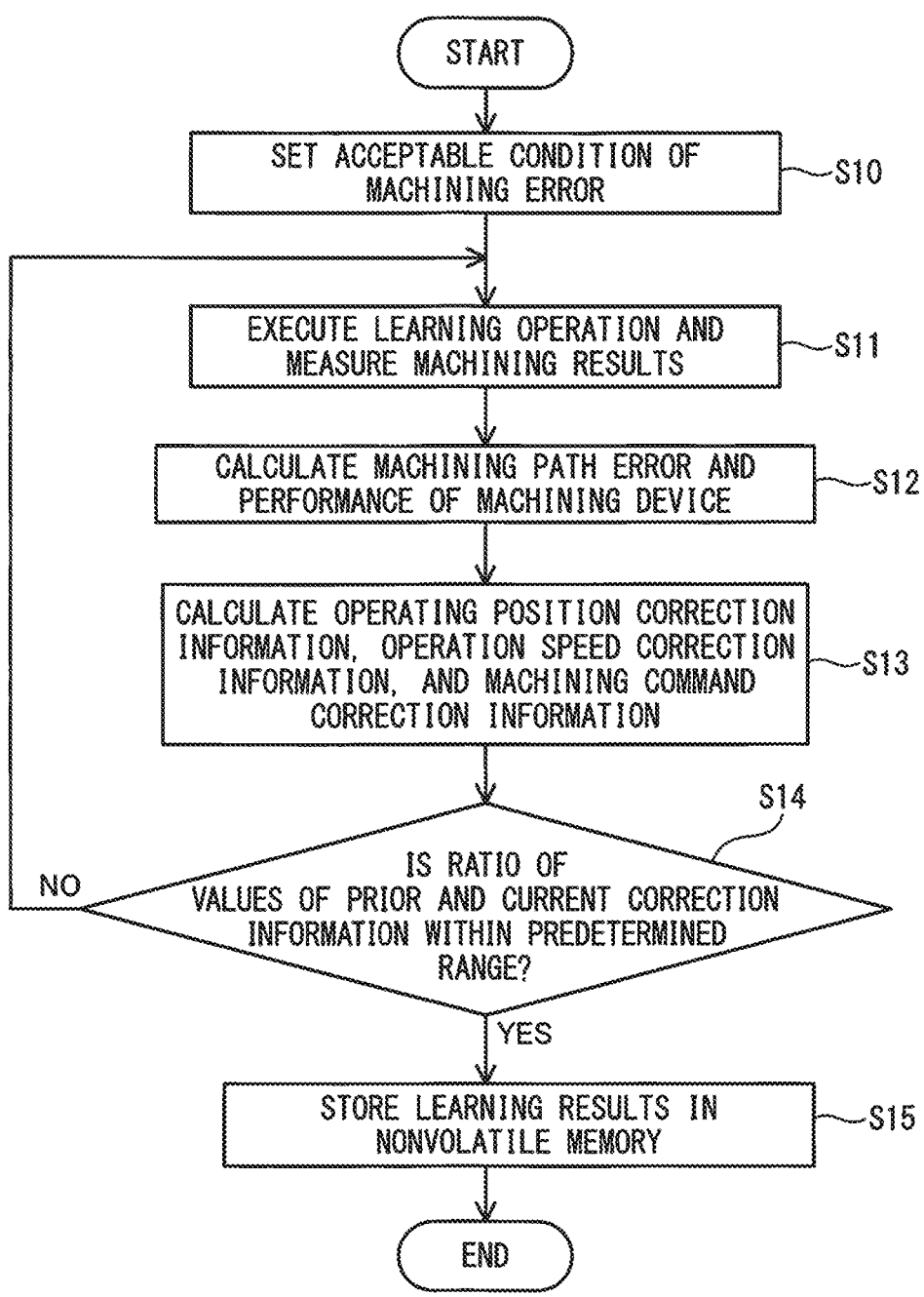
FIG. 4 is a flowchart illustrating a control method of the robot system according to the embodiment.

FIG. 4 is a flowchart showing the control method of the robot system 10 according to the present embodiment. Such flowchart is executed by the learning control unit 22 shown in FIG. 3. In step S10, the acceptable condition of the machining error is set. In step S11, the learning operation is executed and the machining results are measured. In step S12, the machining path error and the machining device performance (i.e., response performance and tracking performance) are calculated.

In step S13, the current operating position correction information is calculated, based on the machining path error, so as to satisfy the preset acceptable condition of the machining error. Furthermore, the current operation speed correction information is calculated, based on the machining path error and the tracking performance of the machining device, so as to satisfy the preset acceptable condition of the machining error and under an allowable load condition of the robot mechanism unit. Further, the current machining command correction information is calculated based on the response performance and tracking performance of the machining device, so as to satisfy the preset acceptable condition of the machining error.

In step S14, it is determined whether or not learning has completed by determining whether or not the ratio of the values of the prior and the current correction information is within a predetermined range. When learning has not been completed (NO in step S14), the operation returns to step S11, and learning is repeated. When learning has completed (YES in step S14), the process proceeds to step S15, and the learning results (i.e., the converging correction information) are stored in the nonvolatile memory.

Figure 5A:
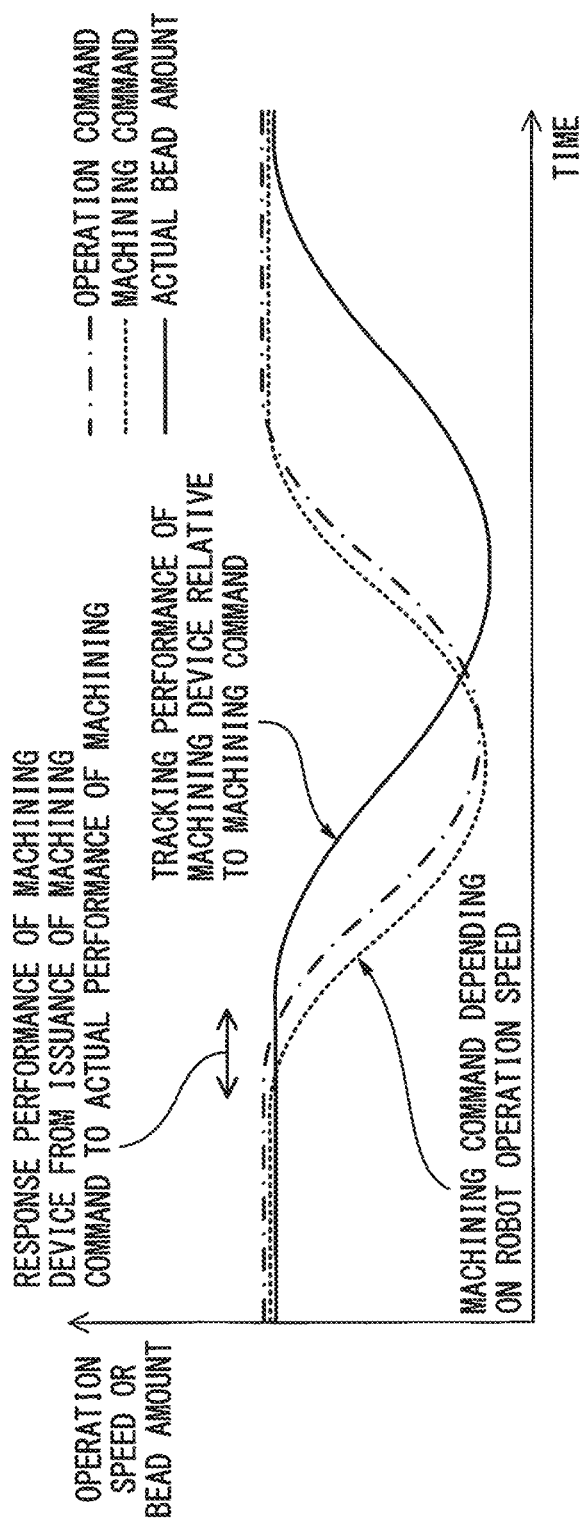
FIG. 5A is a graph showing a motion command issued to the robot, the machining command issued to a machining device, and an actual bead amount prior to learning.

FIG. 5A is a graph showing the motion command issued to the robot 11, the machining command issued to the machining device 13, and the actual bead amount prior to learning. Prior to learning, the waveform of the machining command is identical to the waveform of the motion command and is generated with a timing which is slightly hastened as compared to the motion command. In this example, the changing point of the actual bead amount due to the response performance of the machining device 13 is slightly later than the changing point of the machining command, and the amount of change per unit time of the bead amount due to the tracking performance of the machining device 13 is more moderate than the amount of change per unit time of the machining command.

FIG. 5B is a graph showing the motion command issued to the robot 11, the machining command issued to the machining device 13, and the actual bead amount after learning. After learning, the amount of change per unit time of the motion command matches the tracking performance of the machining device 13 (i.e., the amount of change per unit time of the actual bead amount). Furthermore, the timing at which the machining command is performed is corrected (in this example, the timing at which the machining command is performed is hastened only by the response time) based on the response performance of the machining device 13 (i.e., the response time taken from the issuance of the machining command until machining is actually performed) and the amount of change per unit time of the machining command matches the tracking performance of the machining device 13 (i.e., the amount of change per unit time of the actual bead amount). As a result, the change in the actual bead amount and the change in the motion command match, and the bead amount is constant even at the corners, at which the operation speed changes.

Figure 6A:
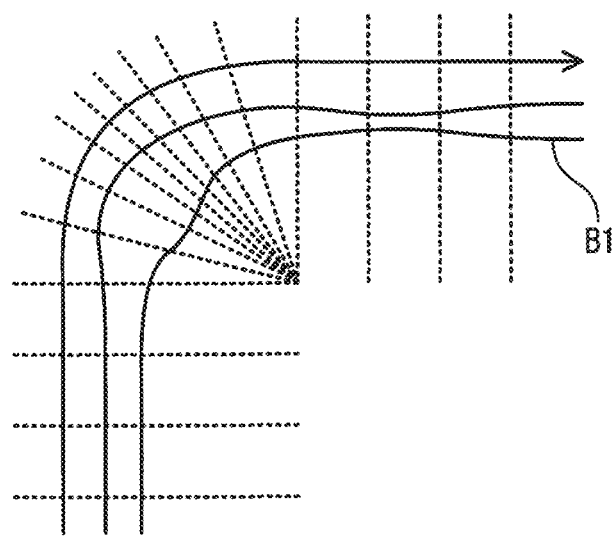
FIG. 6A is a plan view showing an actual bead at a corner prior to learning.

FIG. 6A is a plan view showing the actual bead B1 at the corner prior to learning. As described for FIG. 5A, though, prior to learning, as the operation speed of the robot 11 decreases at the corners, the machining command also decreases, the width and thickness of the bead B1 are not constant due to the response performance and tracking performance of the machining device 13. Note that, each wavy line in FIG. 6 represents the moving distance of the robot per unit time and the actual bead amount is calculated for each unit time.

Figure 6B:
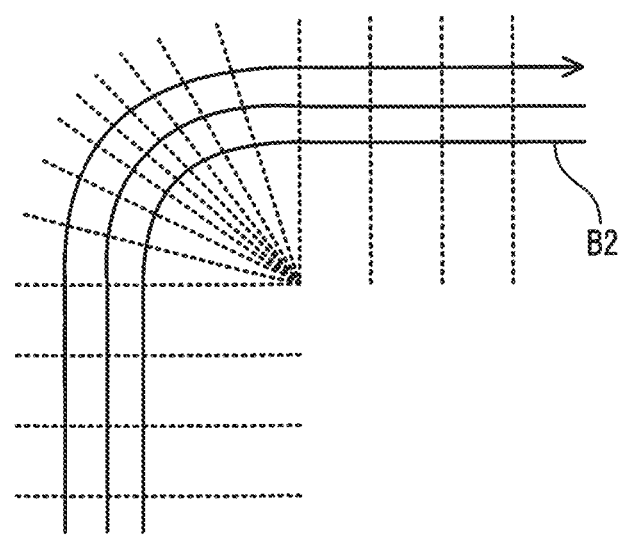
FIG. 6B is a plan view showing an actual bead at a corner after learning.

FIG. 6B is a plan view showing the actual bead B2 at the corner after learning. After learning, even if the operation speed of the robot 11 decreases at the corner, the amount of change per unit time of the motion command matches the tracking performance of the machining device 13, and since the timing at which the machining command is performed is corrected based on the response performance of the machining device 13, and the amount of change per unit time of the machining command matches the tracking performance of the machining device 13, the bead amount across the entire corner is constant. Note that the present invention can be applied to other embodiments, in which the performance of the machining device 13 exceeds the performance of the robot 11.

FIG. 7 is a block diagram of a robot system 40 according to another embodiment, comprising a plurality of sets of machining systems 41 to 43, and a server device 44 which is communicable with the plurality of sets of machining systems 41 to 43. The plurality of sets of machining systems 41 to 43 each comprises the robot 11, machining device 13, controller 14, and sensor 15 mentioned above. The server device 44 comprises a communication control unit 45 for controlling communication with the plurality of sets of machining systems 41 to 43, a learning control unit 46 for performing learning control based on the motion commands, machining commands, and machining results received from the plurality of sets of machining systems 41 to 43, and a storage unit 47 for storing learning conditions and learning results. The learning control unit 46 comprises the same constituent elements as the learning control unit 22 of FIG. 3.

When the plurality of sets of machining systems 41 to 43 perform the same machining on workpieces 12, the plurality of sets of machining systems 41 to 43 share at least one of the learning conditions and learning results stored in the server device 44. Note that the learning conditions include the acceptable condition of the machining error and the allowable load of the robot mechanism unit, and the learning results include the converging correction information. According to such a configuration, since the plurality of sets of machining systems 41 to 43 can use at least one of the learning conditions and learning results of the other machining systems, the workload is reduced or the learning time is reduced.

According to the present embodiment, learning can be controlled based on machining results taking the entire system into consideration. As a result, trial and error and skill of the teacher are not necessary, and the workload can be reduced.

The invention claimed is:

1. A robot system, comprising:
a robot, a machining device for machining a workpiece, a controller for controlling the robot and the machining device, a sensor for detecting machining results, and a learning control unit for performing learning control based on the machining results, wherein
the learning control unit comprises:
a machining device performance calculation section for calculating performance of the machining device during machining or after machining based on a motion command issued to the robot by the controller, a machining command issued to the machining device by the controller, and machining results measured by the sensor, and
an operation speed correction information calculation section for calculating operation speed correction information of the robot based on the performance of the machining device so as to satisfy a preset acceptable condition of the machining error, and under an allowable load condition of the robot.

2. The robot system according to claim 1, wherein
the learning control unit further comprises a machining command correction information calculation section for calculating machining command correction information based on the performance of the machining device so as to satisfy the preset acceptable condition of the machining error.

3. The robot system according to claim 2, wherein the performance of the machining device includes response performance of the machining device, which is a response time taken from the issuance of the machining command to the actual performance of machining, and tracking performance of the machining device in response to the machining command.

4. The robot system according to claim 3, wherein the machining command correction information calculation section calculates the machining command correction information so as to correct timing of the machining command based on the response performance of the machining device and to match the amount of change per unit time of the machining command with the tracking performance of the machining device.

5. The robot system according to claim 3, wherein the operation speed correction information calculation section calculates operation speed correction information of the robot so as to match the amount of change per unit time of the motion command with the tracking performance of the machining device.

6. The robot system according to claim 1, wherein the machining device comprises a sealing device for performing sealing of the workpiece based on a sealant flow rate command which is the machining command, or an arc welding device for performing arc welding on the workpiece based on a welding wire feed command which is the machining command.

7. The robot system according to claim 1, wherein the acceptable condition of the machining error includes at least one of a machining path tolerance, a bead width tolerance, and a bead thickness tolerance.

8. The robot system according to claim 1, further comprising an acceptable condition setting means with which a teacher can set, in advance, the acceptable condition of the machining error.

9. The robot system according to claim 3, wherein the machining device performance calculation section calculates tracking performance of the machining device by calculating an actual bead amount per unit time from the motion command and the machining results, calculating the response performance of the machining device based on a time difference between a changing point of the machining command and a changing point of the actual bead amount, and calculating an amount of change per unit time of the actual bead amount.

10. The robot system according to claim 1, wherein
the learning control unit further comprises a machining path error calculation section for calculating a machining path error relative to a target path based on the motion command and the machining results, and
the operation speed correction information calculation section further calculates operation speed correction information of the robot based on the machining path error so as to satisfy the preset acceptable condition of the machining error, and under the allowable load condition of the robot.

11. The robot system according to claim 10, wherein the learning control unit further comprises an operating position correction information calculation section for calculating operating position correction information of the robot based on the machining path error so as to satisfy the preset acceptable condition of the machining error.

12. A robot system, comprising:
a plurality of sets of machining systems each comprising
a robot,
a machining device configured to machine a workpiece,
a controller configured to control the robot and the machining device, and
a sensor configured to detect machining results;
a learning control unit configured to perform learning control based on the machining results, wherein the learning control unit comprises:
a machining device performance calculation section configured to calculate, for at least one of the plurality of sets of machining systems, performance of the machining device during machining or after machining based on a motion command issued to the robot by the controller, a machining command issued to the machining device by the controller, and the machining results detected by the sensor, and
an operation speed correction information calculation section configured to, based on the performance of the machining device, calculate operation speed correction information of the robot so as to satisfy a preset acceptable condition of a machining error, and under an allowable load condition of the robot; and
a server device configured to communicate with the plurality of sets of machining systems,
wherein the plurality of sets of machining systems share at least one of learning conditions and learning results stored in the server device.

13. The robot system according to claim 12, wherein the controller of one of the plurality of sets of machining systems comprises the learning control unit.

14. The robot system according to claim 12, wherein the server device comprises the learning control unit.

15. A method for the control of a robot system comprising a robot, a machining device for machining a workpiece, a controller for controlling the robot and the machining device, a sensor for measuring machining results, and a learning control unit for performing learning control based on the machining results, the method comprising the steps of:

calculating performance of the machining device during machining or after machining based on a motion command issued to the robot by the controller, a machining command issued to the machining device by the controller, and machining results measured by the sensor, and calculating operation speed correction information of the robot based on the performance of the machining device so as to satisfy a preset acceptable condition of the machining error, and under an allowable load condition of the robot.

* * * * *